United States Patent
Zhou

(10) Patent No.: US 7,809,515 B2
(45) Date of Patent: Oct. 5, 2010

(54) PROTECTION DEVICE AND A METHOD THAT DETECT ELECTRICITY

(75) Inventor: Jian-Lin Zhou, Dong-guan (CN)

(73) Assignee: Mig Technology, Inc., Dong-guan, Guang-dong Province (CN)

( * ) Notice: Subject to any disclaimer, the term of this patent is extended or adjusted under 35 U.S.C. 154(b) by 0 days.

(21) Appl. No.: 11/600,924

(22) Filed: Nov. 17, 2006

(65) Prior Publication Data

US 2008/0120048 A1    May 22, 2008

(51) Int. Cl.
*H02H 3/00*    (2006.01)
*G06F 17/00*    (2006.01)

(52) U.S. Cl. .............................. 702/64; 702/58; 702/59; 702/80; 361/1

(58) Field of Classification Search ................... 702/64, 702/58, 59, 80
See application file for complete search history.

(56) References Cited

U.S. PATENT DOCUMENTS 5,629,826 A * 5/1997 Roca et al. .................. 361/118
5,835,326 A * 11/1998 Callaway ..................... 361/111
5,962,932 A * 10/1999 Matlo ......................... 307/126
6,204,747 B1 * 3/2001 Kitchens ..................... 337/407

* cited by examiner

*Primary Examiner*—Hal D Wachsman
(74) *Attorney, Agent, or Firm*—Muncy, Geissler, Olds & Lowe, PLLC

(57) ABSTRACT

A protection device for detecting electricity is composed of a control unit, a set of input ends for sampling, a display unit, an acoustic signal generating unit, and a power unit. The aforementioned control unit includes a microprocessor (CPU), a clock pulse wave generator, a first memory, a second memory, an input/output port, and a timer. The microprocessor processes defects in sampled electrical data, such as voltage and current, to display power consumed and accumulated time of use, such that a user can be aware of the electricity information at any time for preparation. The sampled data are compared with each setting value pre-stored in the second memory, and if any one of the data exceeds the setting value, the microprocessor will output a warning signal or shut down the power, to maintain safety.

12 Claims, 3 Drawing Sheets

PROTECTION DEVICE AND A METHOD THAT DETECT ELECTRICITY

BACKGROUND OF THE INVENTION (a) Field of the Invention

The present invention relates to a protection device and a method that detect electricity, and more particularly to a protection device and a method that are applied to a power extension cord and are assembled on extension sockets to provide a notification of power consumption for loaded electric appliances, so as to enable a user to trade off power usage and to prevent from an unexpected incident in advance, as well as to automatically give off a warning signal or shut down the power when the power extension cord is overloaded, thereby acquiring a function of safety maintenance, self limiting time of use, and assuring a safe usage.

(b) Description of the Prior Art

It is known that in using an electric product, a user will insert a power plug of the electric product into a power outlet on a wall. If the electric product is still at a certain distance from the power outlet on the wall, then a power extension cord will be used for adaptation, such that the electric product can be used at any place.

All of the existing power extension cords are provided with marks of safety regulations. When the power extension cord is plugged with too many electric products and once the power load is exceeded, the power extension cord will automatically shut down the power to avoid danger. Although the power extension cord is provided with a specification of power safety regulations, the user will usually ignore the safety regulations written on the power extension cord while using the power extension cord, and plug multiple electric products on the same power extension cord for use, which will easily result in danger. In spite of the aforementioned protection device, it is still easy to cause danger under a condition of unstable power source. In addition, as the power extension cord is used for a long time, its wiring material will have a change of physical property, such as an increase of impedance of a lead wire, or a decomposition and embrittlement of an insulator. In this case, time of its availability should be estimated and when that time is reached, the power extension cord should be discarded to maintain safety.

The most efficient method for maintaining safety of the power extension cord is to keep the total load explicitly below a practical value specified by the safety regulations. This operation is dependent upon the user's decision; for example, it is preferred to keep the total power consumption below 80% of the regulation. However, as the conventional design is not able to allow the user to acquire related data at any time, it is unable to carry out a preventive operation in advance.

All of the conventional safety devices are designed to operate when the load is exceeded or a critical load value is achieved, and the user can not access information of electricity in a range between the lowest load and the highest critical load value at any time. For example, a safety limit of an extension cord to be used is set to 600 W, and its work load of use has achieved 595 W (ignoring an allowable error). If power is unstable or one of its electric products is short-circuited, then the extension cord will be substantially overloaded, forming a significant creepage or trip sparks, or event resulting in a blowout and burning. In the mean time, other electric products that are in use, such as a computer or any related electric equipment for accessing information, will be affected and shut down, or their logic operation units or programs will be damaged.

Many conventional protection devices are only designed to serve as the protection at an end of incident. For example, an outlet installed on a wall, or a socket of an extension cord, uses temperature or current detection as a reference of protection and only issues a notification signal before a critical load is achieved.

On the other hand, as there are multiple sets of power socket terminal, one to a full number of plugs of electric products can be inserted. However, for the conventional power socket, the power consumption requirement of a single electric product cannot be acquired at any time and at will; for example, the ordinary user is not able to know the power consumption of an electric heater which consumes a large amount of power and overly turns it on at will, because its labeling texts of shipment are tiny, stained, or lost, thereby causing an unnecessary power waste. In particular, under a current situation of energy shortage, if the user can be easily aware of the power consumption, he or she will be able to manually determine the condition of use in accordance with a common knowledge that one kw/h is equal to one degree of power, so as to save the power of use, which will play an important role in reducing the unnecessary loss of global energy.

SUMMARY OF THE INVENTION

Accordingly, the primary object of present invention is to provide a protection device that detects electricity, which is installed in an interior of a power extension cord. The device is able to display and inform a user a total load value of voltage, current, and power of that power extension cord, and once one or more than two values exceed a setting, the device will display immediately and notify the user in advance. Moreover, in correspondence with a state of degradation of wiring material, time of use will be accumulated and the device will be "discarded by itself" prior to an end of its lifetime, i.e., the microprocessor will permanently cut-off power flow through the cord thereby preventing further usage.

Accordingly, the present device includes a control unit, an input end for sampling, a display unit, a warning unit, and a power unit, wherein the aforementioned control unit is composed of a microprocessor (CPU), a clock pulse wave generator, a first memory, a second memory, an input/output port, and a timer. Based on the voltage and current sampled at the input end for sampling of a load, the microprocessor will determine power, time of use, and a number of outages, which are compared with each setting stored in the second memory. If any one of the data exceeds the setting, the microprocessor will output a warning signal.

Another object of the present invention is to provide a power switch at each of a plurality of terminals which is serially installed on sockets of an extension cord. In addition to performing an ordinary energizing operation, the power switch can select a single electric product for detecting its power requirement in association with the detection device of present invention, and the power value can be shown on the display unit. Therefore, the user can easily access the power consumption of one of the electric products, such as a high power-consumption electric heater, in order to be prepared while using it, such that the electric product can be used economically without consuming power excessively, which will have a significantly positive effect on energy saving.

In addition, as the present invention is able to detect the voltage and current, a temperature state can be computed from them, along with the resistivity of wiring material to be used. If the temperature exceeds a safety limit, then it is deemed to be over-heating and an alert or an outage will be activated.

To enable a further understanding of the objectives and the technological methods of the invention herein, the brief description of the drawings below is followed by the detailed description of the preferred embodiments.

DETAILED DESCRIPTION OF THE PREFERRED EMBODIMENTS

Figure 1:
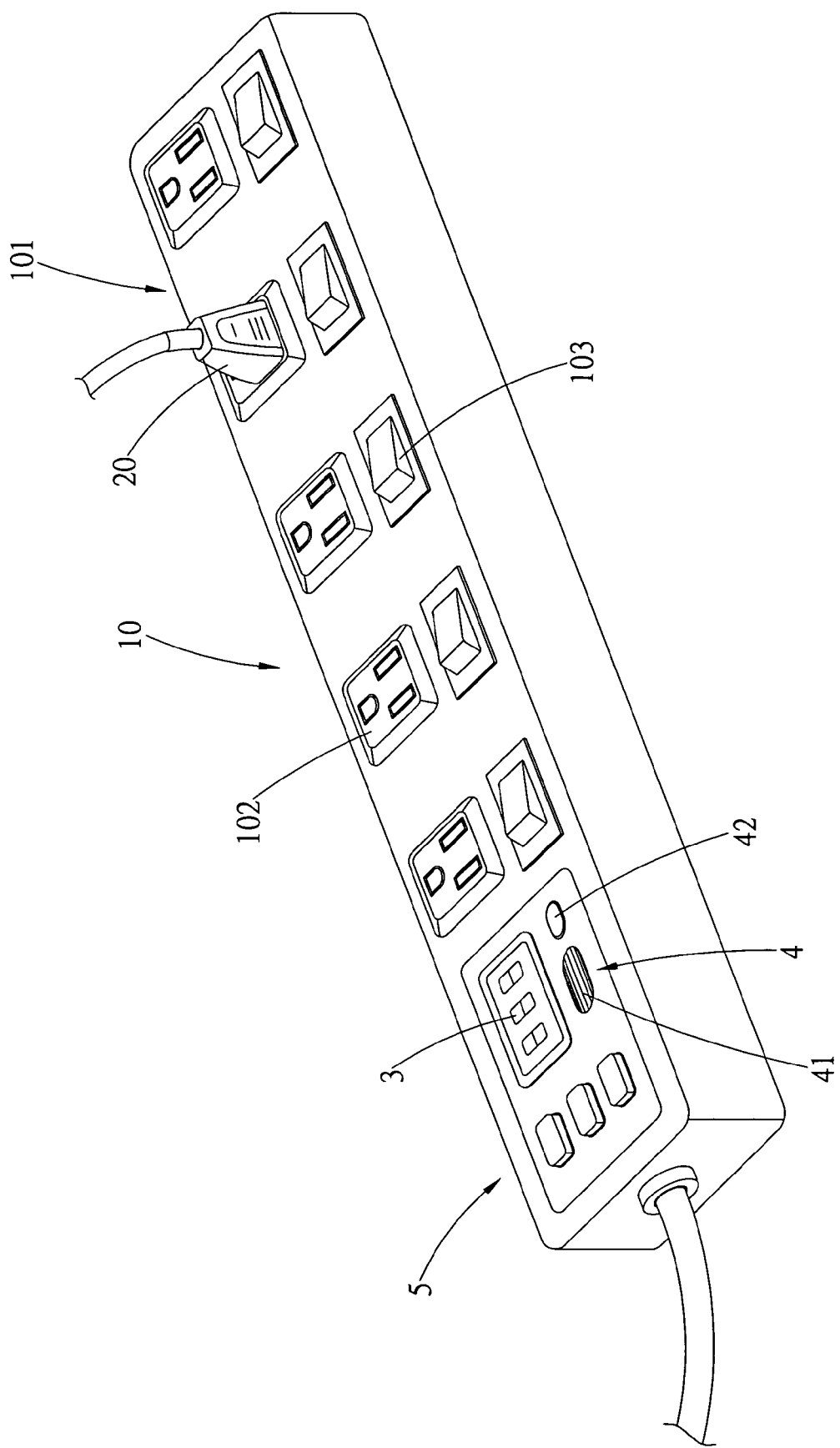
FIG. 1 shows a schematic view of an appearance of a power extension cord according to the present invention.

Referring to FIG. 1, it shows a schematic view of an appearance of a power extension cord according to the present invention. As shown in the drawing, a protection device that detects electricity is installed on a power extension cord 10 to display a total load value of voltage, current, and power, and once any one or more than two values exceed a setting, the device will pre-notify a user immediately to take an action for maintaining safety. In addition, in correspondence with a state of degradation of wiring material, time of use will be accumulated, and the device will be discarded by itself prior to an end of its lifetime.

The aforementioned power extension cord 10 is provided with sockets 101 having a plurality of insertion terminals 102. Each insertion terminal 102 corresponds to a switch 103, and after a plug 20 of a load is inserted into the insertion terminal 102 and the switch 103 is pressed down, power will be transmitted to the plug 20 to activate the load. In the mean time, power consumed by the load will be displayed on the display unit 3; therefore a user can easily access the power consumption of that load from the display unit 3.

Moreover, a side of the socket 101 is configured with the display unit 3, a warning-simulation unit 4 (e.g., a warning buzzer or lamp), and a selection key 5. The aforementioned display unit 3 is used to display the voltage, current, power, and time of use counted for each load in use. The warning-simulation unit 4 is provided with a buzzer 41 and an illumination element 42, such that a warning sound can be generated through the buzzer 41 and a flashing display can be generated through the illumination element 42, in order to notify the user.

The selection key 5 is composed of a plurality of press buttons to provide the user to select any one of the consumption value of voltage, current, and power.

Figure 2:
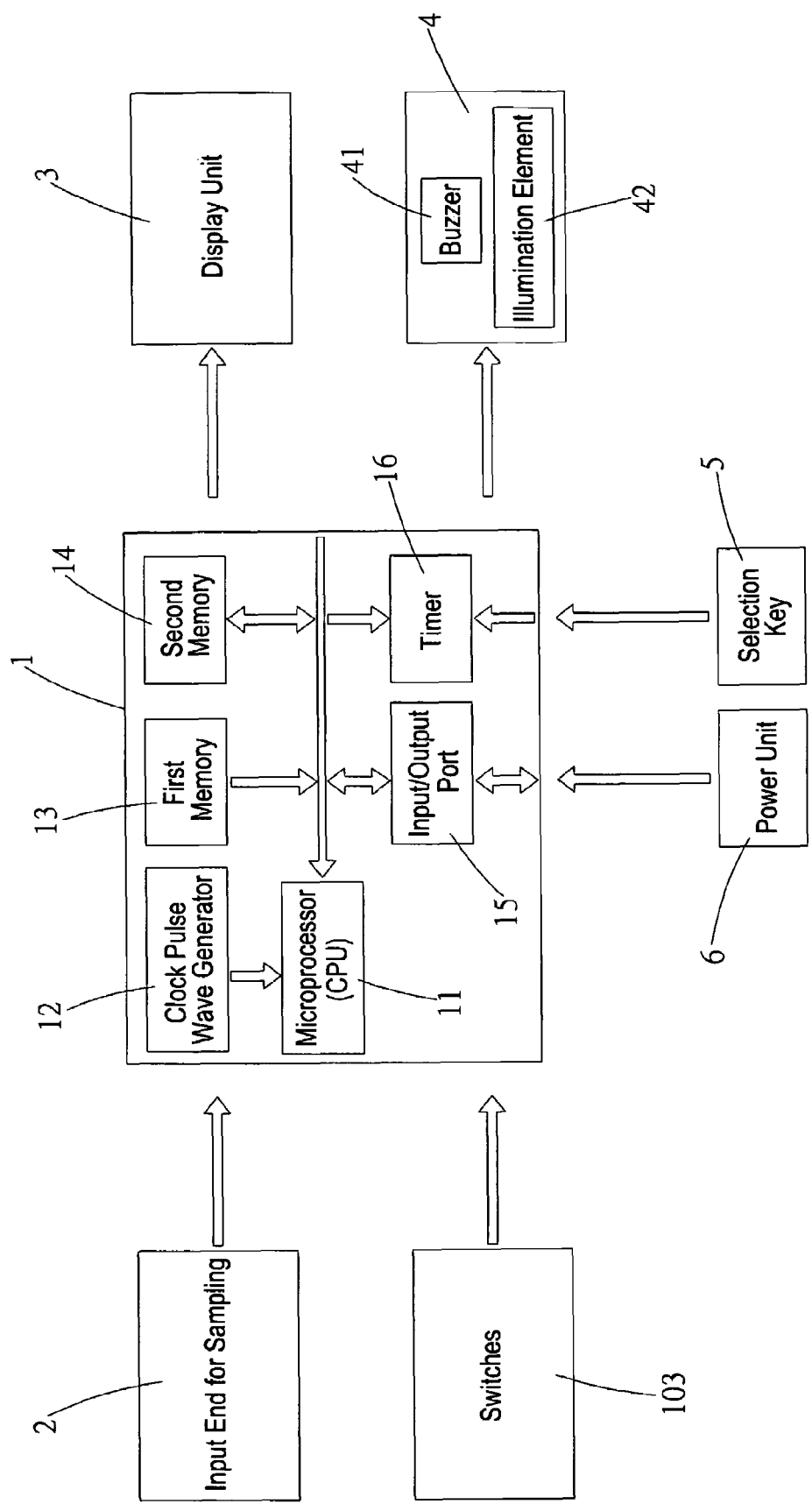
FIG. 2 shows a circuit block diagram of a protection device that detects electricity according to the present invention.

Referring to FIG. 2, it shows a circuit block diagram of the device according to the present invention. As shown in the drawing, a protection device that detects electricity of the present invention comprises a control unit 1, a set of input ends for sampling 2, a display unit 3, a warning-simulation unit 4, a selection key 5, and a power unit 6. The protection device that detects electricity assembled by the aforementioned components is installed on a power socket of an extension cord to monitor a state of power usage of the power socket, and to display voltage, current, and power to be used, or to accumulate total "time of use," i.e., the total electrical use of the cord starting from the first time an electrical device is plugged into the extension cord. These data will be informed to the user to assure a safe usage.

The aforementioned control unit 1 includes a microprocessor (CPU) 11, a clock pulse wave generator 12, a first memory 13, a second memory 14, an input/output port 15, and a timer 16; whereas the aforementioned microprocessor 11 is a control kernel of the entire device.

The clock pulse wave generator 12 is electrically connected with the microprocessor 11 to generate a continuous clock pulse wave signal into the microprocessor 11, for providing the microprocessor 11 to proceed with counting the total time of use of the extension cord. When an end of lifetime predicted is achieved, the device will be "discarded by itself," i.e., the microprocessor will permanently cut-off power flow through the cord thereby preventing further use.

The first memory 13 is electrically connected with the microprocessor 11 to store programs and data which have been edited.

The microprocessor 11 will, based on the programs and data stored in the first memory 13, proceed with all kinds of control. In the present drawing, the first memory 13 is a ROM (Read-Only Memory).

The second memory 14 is electrically connected with the microprocessor 11 to store all kinds of comparison data, such as time of use, a number of automatic protection shut-downs, a current setting value, a voltage setting value, and a power setting value. In the present drawing, the second memory 14 is a RAM (Random-Access Memory).

The input/output port 15 is electrically connected with the microprocessor 11, and in the present drawing, the input/output port 15 is a USB port, such that a data update of the first and second memories can be performed through a USB transmission line.

The timer 16 is electrically connected with the microprocessor 11 to provide the user to configure time of a single use by himself or herself.

The set of input ends for sampling 2 described above is electrically connected with the control unit 1 to access the voltage value and current value of a load in use. After computing by the microprocessor 11, whether these data have exceeded the voltage and current settings is determined.

The display unit 3 is electrically connected with the control unit 1 to display the voltage value, current value, power value, and time of use counted for the load in use. In the present drawing, the display unit 3 is a liquid crystal display (LCD) screen.

The warning-simulation unit 4 is electrically connected with the control unit 1, and is driven by a control signal output by the control unit 1, to generate the sound or flashing light for notification. In the present drawing, the warning-simulation unit 4 is a buzzer 41 or an illumination element 42.

The selection key 5 is electrically connected with the control unit 1 and is constituted by a plurality of press buttons, to provide the user to select one of them for acquiring any one kind of the total consumption value of the voltage, current, and power.

The plural switches 103 are electrically connected with the control unit 1. After any one switch 103 is pressed down, power source is transmitted to a plug 20 (as shown in FIG. 1) to activate the load. In the mean time, power consumed by the load can be displayed on the display unit 3, such that the user can easily access the power consumption of that load from the display unit 3.

The power unit 6 is electrically connected with the control unit 1 to provide the necessary power source to the control unit 1, display unit 3, and warning-simulation unit 4.

The device of present invention is installed into an interior of a power socket of a power extension cord (not shown in the drawings), and when a plug of the extension cord feeds the power into the extension cord, the display unit 3 will display whether an output voltage of power socket on a wall is between 110 to 240V. When there is not any load of electric product (not shown in the drawings) plugged into the power socket of power extension cord, the display unit 3 will not display anything.

On the other hand, if the power cord plug 20 of a single or a plurality of electric products is inserted into the insertion terminal 102 (as shown in FIG. 1) of the power extension cord for use, then the display unit 3 will display the total value of voltage, current, and power used by the electric product.

When the power plug 20 (as shown in FIG. 1) of electric product is inserted into the insertion terminal 102 (as shown in FIG. 1) of power extension cord, the clock pulse wave generator 12 will immediately generate a continuous clock pulse wave signal and transmit it into the microprocessor 11 which will start to count promptly, and store the time counted into the second memory 14. Once the accumulated time of use reaches to a specified total time of use (e.g., 50,000 hours), the microprocessor 11 will automatically output a signal to drive the warning-simulation unit 4 to generate the sound and flashing light to notify the user and to shut down the power, which prohibits the power socket of extension cord to supply the power for use (discarded by itself), thereby preventing the power socket of extension cord from causing danger due to an aging of its internal components.

In the same time, the number of protection shut-downs is accumulated by the microprocessor 11 and is stored in the second memory 14. If the microprocessor 11 determines that the number of protective trips exceeds a setting of number of protection shut-downs (e.g., 30 times) stored in the second memory 14, then the microprocessor 11 will shut down the power supply. In the mean time, the microprocessor 11 will output a signal to drive the warning-simulation unit 4 to generate the sound and flashing light to notify the user.

The microprocessor 11 will base on the voltage and current sampled by the set of input ends for sampling 2 to compare with the voltage setting and current setting stored in an interior of the second memory 14. If the sampled voltage or current value exceeds the setting, then the microprocessor 11 will output a signal to drive the warning-simulation unit 4 to generate the sound and flashing light to notify the user that the voltage or current has exceeded the setting. At this time, the user can immediately determine the power of use to assure the safety of use.

When the power socket of extension cord is inserted with the power plug of electric product, the power consumed by the electric product will be computed by the microprocessor 11 to compare with the power setting stored in the second memory 14. If the power consumed exceeds the power setting stored in the second memory 14, the microprocessor 11 will immediately shut down the power supply of power extension cord. In the same time, the microprocessor 11 will output a signal to drive the warning-simulation unit 4 to generate the sound and flashing light to notify the user.

When the user presses down any one press button of the selection key 5, he or she can be selectively aware of any one of the total consumption value of voltage, current, and power.

When the user presses down any one switch 103, the power will be transmitted to the plug 20 (as shown in FIG. 1) to activate the load, and in the mean time, the power consumed by that load will be displayed on the display unit 3, such that the user can easily access the power consumption of that load from the display unit 3.

Furthermore, the present invention can be added with a temperature sensor which is electrically connected with the control unit 1. When the electric product is plugged on the power extension cord for use, temperature of a heat source which is generated by consuming power of the power extension cord will be transmitted to the display unit 3 for display. In the mean time, when the electric product is used, if temperature of the power extension cord rises to exceed a temperature setting stored in the second memory 14, the microprocessor 11 will immediately shut down the power supply of power extension cord.

Moreover, the microprocessor 11 can store a total power of use of the electric product into the second memory 14, to facilitate the user to convert into a fare of electricity.

Figure 3:
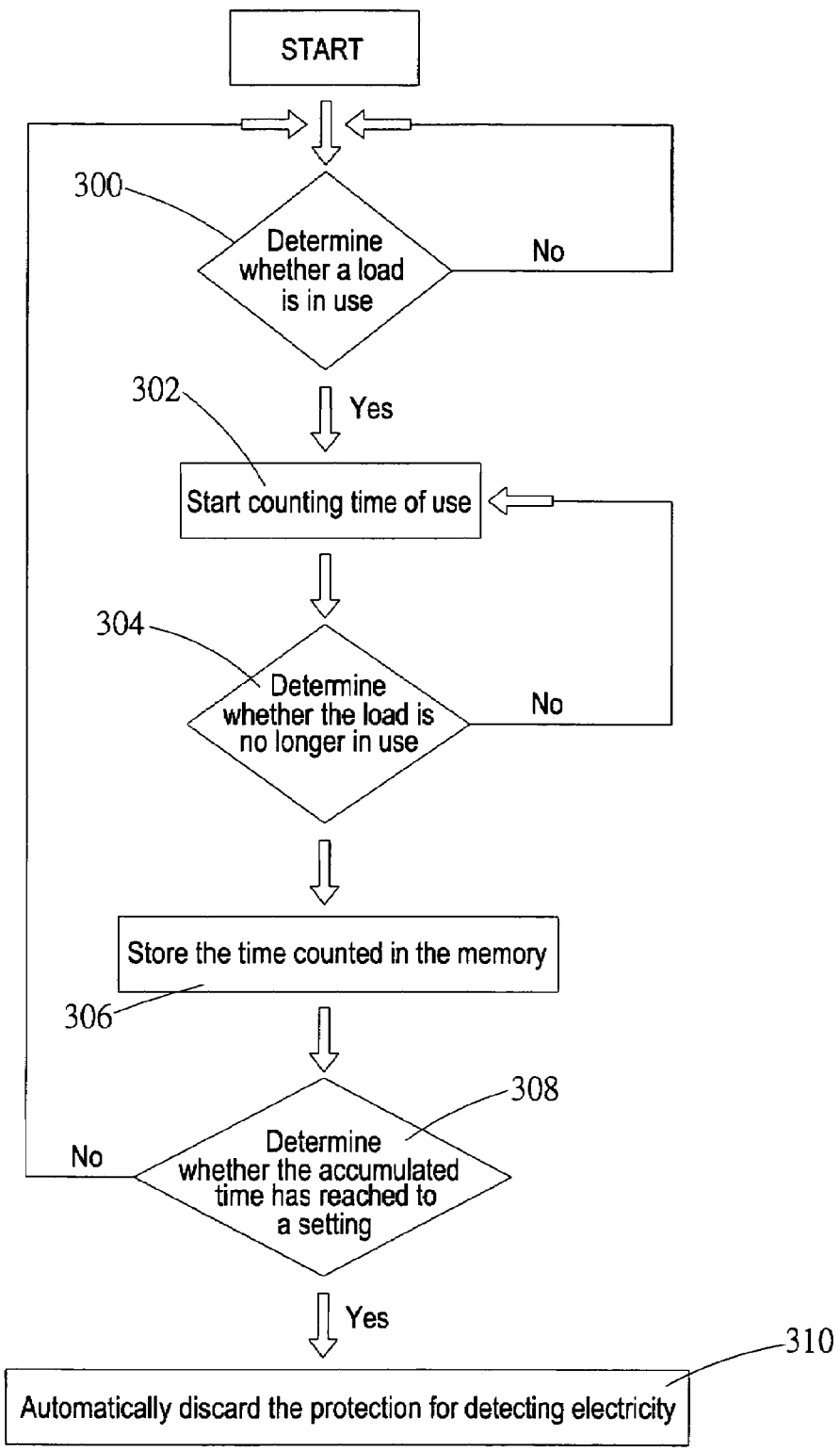
FIG. 3 shows a flow diagram of a protection method that detects electricity according to the present invention.

Referring to FIG. 3, it shows a schematic view of a protection flow for detecting electricity. As shown in the drawing, upon starting the protection for detecting electricity, whether a load is in use is first determined (as a step 300).

If there is no load in use, then a determination of whether a load is used is continued. On the other hand, if there is a load in use, then a step 302 is activated to start counting.

Next, a determination of whether the load is no longer in use (as a step 304) is carried on. If it is determined that the load has not been deactivated, then the counting is continued. Otherwise, if it is determined that the load has been deactivated, then the counting is stopped and the time counted is stored in the memory (as a step 306).

Next, a determination of whether the accumulated time has reached to a setting (as a step 308) is performed. If it is determined that the accumulated time has not exceeded the setting, then the flow will go back to the step 300. Otherwise, if it is determined that the accumulated time has exceeded the setting (e.g., 50,000 hours), then the flow will enter into a step 310, wherein the protection for detecting electricity will be automatically discarded, such that the power extension cord cannot be used anymore to assure safety.

It is of course to be understood that the embodiments described herein is merely illustrative of the principles of the invention and that a wide variety of modifications thereto may be effected by persons skilled in the art without departing from the spirit and scope of the invention as set forth in the following claims.

What is claimed is:

1. A protection device that detects electricity and being configured in an interior of a power socket of a power extension cord, comprising a control unit, which is a monitoring kernel of an entire power source, and includes a microprocessor, a clock pulse wave generator being electrically connected with the microprocessor to generate a continuous clock pulse wave signal into the microprocessor for counting time of use, a first memory being electrically connected with the microprocessor to store programs and data that have been edited, and a second memory being electrically connected with the microprocessor to store the time of use, a number of protection shut-downs, a current setting value, a voltage setting value, and a power setting value;

a set of input ends for sampling, which is electrically connected with the control unit to transmit a sampled value of voltage and current into the microprocessor;

a display unit, which is electrically connected with the microprocessor to display the voltage, current, and power; and a warning-simulation unit which is electrically connected with the control unit;

wherein the microprocessor processes the sampled voltage and current taken from the input end for sampling voltage and the input end for sampling current to determine the power, time of use, and a number of outages for comparing with both the voltage and current setting values stored in the second memory, and to output a signal to drive the warning-simulation unit to generate sound, provided that one or more of the sampled values exceed one or more of the corresponding setting values.

2. The protection device that detects electricity according to claim 1, wherein the first memory is a ROM (Read-Only Memory).

3. The protection device that detects electricity according to claim 1, wherein the second memory is a RAM (Random-Access Memory).

4. The protection device that detects electricity according to claim 1, wherein the control unit is further provided with an input/output port which is electrically connected with the microprocessor.

5. The protection device that detects electricity according to claim 4, wherein the input/output port is a USB port.

6. The protection device that detects electricity according to claim 1, wherein the control unit is further provided with a timer which is electrically connected with the microprocessor to provide a user to configure time of use by himself or herself; when the configured time being reached, the microprocessor shutting down power flow through the power extension cord.

7. The protection device that detects electricity according to claim 1, wherein a temperature sensor is further electrically connected with the control unit, and a temperature value being sensed is transmitted to the display unit for display through the microprocessor.

8. The protection device that detects electricity according to claim 7, wherein the temperature sensor transmits the temperature sensed to the microprocessor for computing and comparing with a temperature setting value stored in the second memory; if the temperature exceeding the temperature setting value, the microprocessor immediately shutting down power flow through the power extension cord.

9. The protection device that detects electricity according to claim 1, wherein the microprocessor stores a total power of use of an electric device connected to the power extension cord into the second memory.

10. The protection device that detects electricity according to claim 1, wherein a selection key is further electrically connected with the control unit, and is constituted by a plurality of press buttons to provide a user to be selectively aware of any one kind of total consumption value of voltage, current, and power.

11. The protection device that detects electricity according to claim 1, wherein a plurality of switches is further electrically connected with the control unit, and after any one switch is pressed down, power is transmitted to a plug to activate load, and in the mean time, the power consumed by the load is displayed on the display unit.

12. A protection method that detects electricity being configured in an interior of a power extension cord to monitor time of use of the power extension cord, comprising
   a) determining whether a load connected to the power extension cord is used;
   b) if a load being in use, starting to count elapsed time of use;
   c) if a load is not deactivated, continuing to count elapsed time of use;
   otherwise, if a load being activated, aborting counting and storing the elapsed time of use counted into a memory; and
   d) if the elapsed time of use being determined to exceed a setting value, permanently preventing power flow through the power extension cord.

* * * * *